United States Patent
Peppmoller et al.

(10) Patent No.: US 7,342,058 B2
(45) Date of Patent: Mar. 11, 2008

(54) WATER ABSORBING HYDROGELS AND METHODS OF MAKING AND USE THEREOF

(75) Inventors: Reinmar Peppmoller, Krefeld (DE); Gerhard Fabritz, Krefeld (DE)

(73) Assignee: Geohumus International GmbH & Co. KG, Frankfurt am Main (DE)

( * ) Notice: Subject to any disclaimer, the term of this patent is extended or adjusted under 35 U.S.C. 154(b) by 340 days.

(21) Appl. No.: 10/482,255

(22) PCT Filed: Jun. 13, 2002

(86) PCT No.: PCT/DE02/02159

§ 371 (c)(1),
(2), (4) Date: Feb. 26, 2004

(87) PCT Pub. No.: WO03/000621

PCT Pub. Date: Jan. 3, 2003

(65) Prior Publication Data

US 2004/0132869 A1    Jul. 8, 2004

(30) Foreign Application Priority Data

Jun. 23, 2001  (DE) ............................... 101 30 427

(51) Int. Cl.
*C08L 97/02* (2006.01)
(52) U.S. Cl. .................... 524/13; 524/47; 524/493; 524/556
(58) Field of Classification Search .................. 524/13, 524/493, 556, 47
See application file for complete search history.

(56) References Cited

U.S. PATENT DOCUMENTS 6,960,617 B2 * 11/2005 Omidian et al. ............ 521/102

FOREIGN PATENT DOCUMENTS

| DE | 146 748 A | 3/1981 |
| EP | 0313255 | 4/1989 |
| EP | 0 483 884 A2 * | 11/1991 |
| FR | 2791992 | 10/2000 |
| GB | 1376091 | 12/1974 |
| WO | WO 91 13541 A | 9/1991 |

OTHER PUBLICATIONS

Patent Abstracts of Japan, vol. 1998, No. 13, Nov. 30, 1998 & JP 10 212188 A, Aug. 11, 1998.

* cited by examiner

*Primary Examiner*—Robert D. Harlan
(74) *Attorney, Agent, or Firm*—Kenyon & Kenyon LLP

(57) ABSTRACT

The invention is directed to a crumbly, water-absorbing, soil-like hydrogel. The hydrogel comprises finely comminuted mineral substances, such as igneous rock; water-soluble alkali-silicate; solid and liquid nutrient additives; and ballast, bound in a cross-linked polymer. The hydrogel is structured like a sponge and absorbs water and liquids when in contact with water or aqueous liquids. The mineral substances present in the hydrogel may be present in an amount of at least 30% by weight of the dried hydrogel. Also, the invention encompasses methods of producing acidic and neutral to weakly alkaline hydrogels.

31 Claims, No Drawings

WATER ABSORBING HYDROGELS AND METHODS OF MAKING AND USE THEREOF

FIELD OF THE INVENTION

The invention is directed to crumbly, water-absorbing, soil-like hydrogels. The hydrogel comprises finely comminuted mineral substances, such as igneous rock; water-soluble alkali-silicate; solid and liquid nutrient additives; and ballast, bound in a cross-linked polymer. The cross-linked polymer hydrogel has a sponge-like structured and absorbs water and liquids upon contact. The mineral substances are present in the hydrogel in an amount of at least 30% by weight of the dry hydrogel, i.e., prior to water absorption. Also, the invention encompasses methods of producing acidic and neutral to weakly alkaline hydrogels.

BACKGROUND OF THE INVENTION

Water and aqueous liquid absorbing hydrogel-forming polymers have been prepared from unsaturated monomers which are water-soluble acid group containing monomers and one or several cross-linking agents having at least two olefinically unsaturated groups in the molecule. Unsaturated water-soluble acid group containing monomers include acrylic acid or derivatives thereof which may be partially neutralized with alkaline. Polymerization may be performed under aqueous conditions or by the process of inverse suspension- or emulsion-polymerization as described in U.S. Pat. Nos. 4,286,082 and 4,340,706 or German Patent Nos. DE-PS 27 06 135 and DE-PS 28 40 010.

Other methods of producing hydrogels from polymers have been described by the production of graft-polymers using modified starch and cellulose (DE-OS 26 12 846) or polyvinylalcohol (DE-PS 40 20 780). The polymer-gel-particles or the powdery resin may be cross-linked on the surface, as described in German Patent No. DE-PS 40 20 780 C1.

Another method of producing hydrogel-forming polymers includes polymerizing partially neutralized acid group-containing monomers which were treated with alkaline prior to the polymerization as discussed in EP 205 674 A1. After the monomers and cross-linking agents react to form a cross-linked polymer material, some of the acid groups are partially neutralized during extrusion. The polymerization occurs within a temperature of 0° C. to 100° C., and preferably within a temperature of 5° C. to 40° C.

The above-discussed polymers as produced by different methods are known as "superabsorbers." The absorption characteristics of superabsorbers make them useful in hygienic and sanitary applications. The superabsorbers must be skin-neutral and completely absorb the secretion rapidly. Therefore, 50 to 80 mol % of the monomers used to form the polymer are acid-group containing monomers which have been neutralized with a salt-forming cation. Greater absorption can be achieved by heat treatment of dried and shredded polymer-particles in presence of a cross-linking agent (DE-PS 40 20 780 C1).

Hydrogel-forming polymers may be used for water-storing, however, botanical use hydrogels have different requirements than the hydrogels described above. For example, plants grow best when the whole soil structure in combination with superabsorbers has been considered. Characteristics such as climate and capillarity of soil are just as important as water-capacity. Superabsorber polymers capable of releasing minerals and nutrients were made, however, the polymers were very sensitive to basic earth and UV-light. Consequently, alkali-silicate was used to overcome these deficiencies. DE-Appl. 10114 169,6.

The hydrogels of the present invention overcome the deficiencies of the prior art by using a robust porous polymer- and solids-containing material, that is air-permeable, water-absorbing, and an optimal source of nutrients for plants.

SUMMARY OF THE INVENTION

One embodiment of the invention encompasses hydrogels comprising a polymer of polymerized unsaturated carboxylic acid monomers; at least one mineral nutrient; and solid additives, wherein the unsaturated carboxylic acid monomers are polymerized and bound in a crosslinked polymer having a porous structure and capable of forming a hydrogel with water and liquids. The mineral nutrient may be igneous rock, either basic igneous rock or acidic igneous rock. The amount of mineral nutrient and solid additives may be at least 30% by weight of the polymer composition.

In another embodiment, the solid additives of the hydrogel are at least one of acid-sensitive minerals, absorbing minerals, ballast and fillers, or natural or synthetic materials of Group N. The acid-sensitive materials produce carbon dioxide for displacing oxygen from the reaction mixture, such as at least one of chalk, dolomites, trass, and magnesite. The absorbing minerals are at least one of thickeners, sponge-stabilizers, cation-catchers, polymerization-inhibitors, and swelling-promoters. The ballast and fillers are at least one of feldspar and quartz-sand. The hydrogel may further comprise at least one of algae, bast, brown coal, hemp, wood, wholemeal of ricinus, hard coal, straw, peat, water-soluble polymers and/or at least one water soluble monomer; at least one crosslinking agent; and at least one water soluble polymer.

In another embodiment of the hydrogel, the unsaturated acid group containing monomer is present in an amount of about 55% to 99% by weight; the water soluble monomer is present in an amount of about 0% to 40% by weight; the crosslinking agent is present in an amount of about 0.01% to 5% by weight; and the water-soluble polymer is present in an amount of about 0% to 30% by weight. In yet another embodiment, the hydrogel further comprises a water-soluble alkali silicate selected from the group consisting of sodium- or potassium-silicate. Optionally, the hydrogel may further comprise at least one solid or liquid having potassium, nitrogen, phosphorus, or silicon containing fertilizers.

Unsaturated acid group containing monomer used in the hydrogel may be at least one of acrylic acid, methacrylic acid, maleic acid, fumaric acid, itaconic acid, vinyl-sulfonic-acid, acrylamido-2-methylpropane-sulfonic-acid, 2-methylacryloyl-oxiethane-sulfonic-acid, 4-vinyl-benzene-sulfonic-acid, allyl-sulfonic-acid, vinyl-toluene-sulfonic-acid, vinyl-phosphonic-acid, or vinyl-benzene-phosphonic-acid. Preferably, the unsaturated acid group containing monomer is at least one of acrylic acid, meth-acrylic acid, or maleic acid.

Water soluble monomer used in the hydrogel may be at least one of acrylamide, methacrylamide, N-alkylene methacrylamide, N-dialkyleneamino-alkylene methacrylamide, N-dialkyleneamino-alkylene methacrylamide, N-methylolmethacrylamide, N-vinylformamide, N-vinyl-acetamide, N-vinyl-N-methyl-acetamide, N-vinyl-N-methyl-formamide, hydroxy-ethyl-acrylate, methacrylic acid-ester of polyethylene-glycol-mono-allyl-ether, or allyl ether of polyethylene-glycol.

In one particular embodiment, the polymerized unsaturated acid group containing monomers of the hydrogel are predominantly potassium-salts. The mineral nutrient of the hydrogel may be lava rock with a particle size less of than 200 μm, preferably, the particle size is less than 100 μm.

Another embodiment of the invention encompasses a process making a hydrogel comprising: mixing mineral nutrients, solid additives, and alkaline material in water to form a slurry; adding at least one unsaturated acid group containing monomer and optionally adding at least one crosslinking agent to the slurry; releasing carbon dioxide and foaming the slurry; polymerizing the monomers to form a hydrogel; and hardening the hydrogel. The process may further comprise adding water soluble monomers, and/or water soluble polymers when adding the unsaturated acid group containing monomer. Also, the process may further comprise cutting and/or shredding the hardened hydrogel.

In one embodiment, the process further comprises adding at least one oxidizing catalyst to avoid clumping together of the solid minerals during mixing. In the process, the alkaline material comprises alkali hydroxide, alkali carbonate, alkali silicate and is present in an amount not more than 40%-mol of the acids in the unsaturated acid containing monomer. In another embodiment, the polymer composition has a degree of neutralization of 0-40%-mol.

The hydrogel of the invention may be used for absorbing aqueous basic liquids, ammonia, or bacterial decomposition of organic materials. Also, the hydrogel may be used as a method of supplying nutrients and water to plants, such as when the hydrogel further comprises a solid or liquid fertilizer. In one embodiment, the hydrogel is embedded in natural and/or synthetic flat fiber structures, such as a mat or fleece. In one embodiment, the hydrogel is embedded in natural and/or synthetic flat fiber structures with lightweight natural or synthetic materials for cultivation of plants in moist areas in completely or partly flooded regions. In another embodiment, the hydrogel further comprises at least one insecticide, pesticide, bactericide, or fungicide.

DETAILED DESCRIPTION OF THE INVENTION

The hydrogels of the invention are water and/or liquid absorbing polymers capable of storing solid materials, such as minerals and plant nutrients, wherein both liquids and solids are slowly released over time to the immediate surroundings. The hydrogels of the invention are directed for use in the botanical field, and typically, the hydrogel of the invention is soil-like, e.g., the consistency is comparable to wet humus. Not to be limited by theory, it is believed that the water holding capacity of the hydrogel of the present invention developed as a function of hydrogel-swelling and pore-capacity. Thus, in part the pores enlarge during swelling. In addition to absorbing water, the hydrogels of the invention may contain minerals and plant nutrients that are slowly released over time to the surroundings. One advantage of adding mineral and nutrients to the hydrogel is to prevent the hydrogel of the invention from floating when the soil is too wet.

The hydrogels of the invention are superabsorbers, i.e., water absorbing polymers made of homo- and/or copolymers of unsaturated carboxylic acid monomers. Unsaturated carboxylic acid monomers include, but are not limited to, unsaturated carboxylic acids, acrylamido- and methacrylamido-alkyl-sulfonic-acids. Unsaturated carboxylic acid monomers include, but are not limited to, acrylic acid, methacrylic acid, maleic acid, fumaric acid, itaconic acid, vinyl-sulfonic-acid, acrylamido-2-methylpropane-sulfonic-acid, 2-methylacryloyl-oxiethane-sulfonic-acid, 4-vinyl-benzene-sulfonic-acid, allyl-sulfonic-acid, vinyl-toluene-sulfonic-acid, vinyl-phosphonic-acid, and vinyl-benzene-phosphonic-acid. Preferably, the unsaturated carboxylic acid monomers include at least one of acrylic acid, metha-acrylic acid, and maleic acid. After polymerization, the acid portion of may be converted to a salt, such as a potassium salt.

The unsaturated carboxylic acid monomers are present within the polymer of the hydrogel in an amount of about 55% to about 99% by weight of the polymer.

Water soluble monomers may be used in the hydrogels of the invention including mono-ethylenic unsaturated monomers. Water soluble monomers, include, but are not limited to, acidamides, N-vinylamides, vinyl-pyrrolidones, and hydroxyalkylene-methacrylates. Preferably, acidamides include, but are not limited to, acrylamide, methacrylamide, N-alkylene methacrylamide, N-dialkylene amino-alkylene methacrylamide, N-dialkylene amino-alkylene methacrylamide, and N-methylol-methacrylamide. N-vinyl-amides include, but are not limited to, N-vinylformamide, N-vinylacetamide, N-vinyl-N-methyl-acetamide, and N-vinyl-N-methyl-formamide. Hydroxyalkylene-methacrylate include, but are not limited to, hydroxy-ethyl-acrylate, methacrylic acid-ester of polyethylene-glycol-mono-allyl-ether, and allylether of polyethylene-glycols.

When the water soluble monomers are present within the polymer of the hydrogel, the water soluble monomers are present in an amount of about 0% to about 40% by weight of the polymer.

Water-soluble polymers include, but are not limited to, homo- and copolymers of the monomers named before, partly saponificated polyvinylacetate, polyvinylalcohol, starch, starch-derivatives, grafted starch, cellulose, cellulose-derivatives, e.g. carboxy-methyl-cellulose and galactomannose, and oxalkylated derivatives. When the water-soluble polymers are present within the polymer of the hydrogel, the water-soluble polymers are present in an amount of about 0% to about 30% by weight of the polymer.

When more than one monomer is present in the polymer of the hydrogel, the monomers other than the unsaturated carboxylic acid monomers may be present within the polymer in an amount up to 50% by weight of the total amount of polymer.

The solid materials of the hydrogel of the invention include, but are not limited to, minerals and plant nutrients. The properties of the hydrogel of the invention can be altered by changing the proportion of polymer-bounded solid minerals in relation to the type and quantity of the minerals. As used herein, the term "polymer-bounded" refers to materials held within the hydrogel polymer matrix whether physically, by chemical bond, and/or by ionic bonding.

Preferably, the mineral nutrient is comminuted igneous rock. The comminuted igneous rock may be divided into two groups according to the rock $SiO_2$ content. The first group, herein defined as basic igneous rock or "Group A," has a $SiO_2$-content less than about 50% by weight. The second group, herein defined as acidic igneous rock or "Group B," has at least 50% by weight of $SiO_2$.

Generally, the hydrogel of the invention should be neutral. Therefore, comminuted rock of the basic igneous rock is preferred, otherwise alkali may be necessary to neutralize comminuted acidic igneous rock. The hydrogel made using solids of the acidic igneous rock is useful when the manufactured product is used for absorption of aqueous basic liquids and/or ammonia or for treatment of the products from bacterial decomposition of organic materials, such as liquid manure.

The inorganic contents of the igneous rock may affect monomer polymerization and consequently, the sponge-like structure or porosity of the hydrogel. Polymerization may be particularly affected by trace elements within the igneous rock, independent of the particle size. Therefore, prior to polymerization it is necessary to ascertain the influence of the comminuted rock.

The comminuted rock particles bound in the polymer are one source of mineral nutrients for plants. The particles should be less than about 200 μm, preferably less than about 100 μm in view of the diameter. As used herein, the diameter of a rock refers to the average diameter of an irregularly shaped rock.

Optionally, the hydrogel of the invention may also contain additional solid additives. The additional solid additives, which may also influence the polymerization process, affect the hydrogel properties. The optional additional solid additives may be divided by their functions into the following categories:

A) Acid-sensitive minerals. Acid-sensitive minerals are minerals such as carbon dioxide-suppliers which stabilize the monomer-solution. Acid-sensitive minerals may react with the acid portion of monomers to produce carbon dioxide, which displaces oxygen from the reaction mixture. Acid-sensitive minerals include, but are not limited to, chalk, trass, dolomite, and magnesite.

B) Absorbing minerals. Absorbing minerals absorb materials into the hydrogel and include, but are not limited to, solution thickeners, sponge-stabilizers, cation-catchers, polymerization-inhibitors, and swelling-promoters. Absorbing materials include, but are not limited to, bentonite.

C) Ballast and Fillers. Ballast and fillers are generally non-reactive and come from natural components of the top-earth or synthetic materials including, but not limited to, feldspar, and quartz sand.

Absorbing minerals, such as bentonite, absorb small amounts of aqueous liquids and act as cation-catchers. Thus, absorbing minerals contribute to the strength and the swelling of the hydrogel into a sponge-like material. The absorbing minerals, however, have an inhibiting effect on polymerization. Therefore, the particle-size of the absorbing minerals should be between 0.1 mm and 8 mm and preferably, between 0.3 mm and 5 mm in diameter.

Ballast and fillers do not react during the polymerization of the hydrogel. Ballast and fillers are counted towards the solid mineral-content of the hydrogel and influence the final weight. There are no special requirements for these ballast-substances except that their particle-size should be similar to the absorbing minerals.

The solid mineral-content of the hydrogel of the invention should be at least about 30% by weight of the dried substances. The solid-mineral content includes the igneous rock of the acid group and basic group, and the solid minerals of acid-sensitive minerals, absorbing materials, and ballast and fillers.

Other components, which may be necessary during production of the hydrogel, are neutralizing agents and alkali-silicate. Optionally, fertilizers containing potassium (K), nitrogen (N), phosphorus (P), and/or silicon (Si) may be added to the hydrogel if desired.

Typically, oxygen is removed from the monomer-solution before prior to polymerization. Nitrogen may be introduced into the solution to replace the oxygen. Acid-sensitive minerals, which are carbonate-containing minerals, produce enough carbon dioxide under the reaction conditions to get a robust and homogeneous sponge-like structure, i.e., porous structure. An alternative method may introduce gaseous carbon dioxide or carbonated water.

The aqueous monomer solution has at least one cross-linking agent present in an amount of 0.01% by weight to 5% by weight of the total amount of monomers. Preferably, the crosslinking agent is present in an amount of 0.1% by weight to 2% by weight of the total amount of monomers. Suitable cross-linking agents are all monomers having at least one or two olefinically unsaturated groups which is reactive against acid groups. Examples of crosslinking agents include, but are not limited to, methylenebisacrylamide; mono-, di-, and polyesters of acrylic acid; methacrylic acid; itaconic acid; and maleic acid of alcohols with more than one hydroxy-group such as 1,4-butandiol, 1,6-hexandiol, polyethyleneglycol, trimethylolpropane, pentaerythrite, glycerine, polyglycerine and derivatives thereof by oxalkylation. Other crosslinking agents include, but are not limited to, diallylacrylamide; diallylphthalate; triallylcitrate; tri-monoallyl-polyethylene-glycolether-citrate; and allylethers of di- and polyols and oxethylates thereof. Allyl ether crosslinkers may further include, but are not limited to, polyallylether of glycerine; trimethylolpropane; pentaerythrite and oxethylates thereof; tetraallyloxyethane, polyglycidylallylethers, ethyleneglycol-glycidylether, and glycerine-glycidylether. Crosslinkers also include amines and salts thereof having at least two olefinically unsaturated substitutes such as di- and triallylamine, and tetraallylammonium chloride.

The radical polymerization may be initiated using commonly known redox-systems. Redox systems include, but are not limited to, peroxo- and azo-substances such as potassium peroxo-monosulfate, potassium peroxo-disulfate, hydroperoxides with one or more reducing agents such as potassium sulfite. Radical initiators include, but are not limited to, sodium peroxide sulfate, potassium disulfite, ascorbic acid, tert-butyl-hydroperoxide, 2,2'-azo-bis(2-methylen-propionamidine)-dihydrochloride, potassium formamidinesulfinate, and ascorbic-acid. Typically, the oxidizing agent is introduced first. Preferably, during the polymerization process initiation is performed by photocatalysis and sensibilisators.

During polymerization, the homogeneously mixed solid minerals in the monomer-solution may agglomerate and flocculate. To avoid agglomeration and flocculation, the polymerization-process should be simple to manage and not have any disturbing reactions. The processes of the invention addressed the problem of agglomeration and flocculation in by at least the two following processes.

One embodiment of the process of the invention comprises mixing minerals and unpolymerizable water-soluble components into alkali silicate, alkali carbonate, and/or carbon dioxide-containing water; adding the water-soluble unsaturated acid group containing monomers and the cross-linking agent; producing foam, i.e., the formation of carbon dioxide; and polymerizing the mixture. Once polymerization had ended, the hydrogel of the invention can be given form by cutting or shredding. Optionally, an oxidizing catalyst may be added to avoid agglomeration when mixing minerals and unpolymerizable water-soluble components. If present, other monomers may be added when the unsaturated acid group containing monomers are added.

If the hydrogel will be used for absorption of alkaline liquids or ammonia, or if the amount of basic igneous rock of Group A was enough to reach a non-sensitive pH-value to plants, then the hydrogel may not be further modified.

However, if necessary, any surplus acid within the hydrogel may be neutralized by adding basic earth and/or alkalihydroxide or by mixing the cut or shredded hydrogel with chalk or dolomite.

Another embodiment of the process of the invention, comprises mixing minerals and unpolymerizable water-soluble components with alkali silicate, alkali hydroxide, alkali carbonate, and/or carbon dioxide-containing water, wherein the amount of alkaline is 40 mol % of the total of acid group containing monomers; adding water-soluble unsaturated acid group containing monomers and crosslinking agents; producing foam, i.e., the formation of carbon dioxide; and polymerizing the mixture. The hydrogel may be cut or shredded after polymerization. The excess alkaline, which is necessary to reach neutrality, is filled into a hydrophilic and/or porous solid mineral. To prevent a reaction of the alkaline with acid groups of the unsaturated acid group containing monomers prior to the foaming step, the alkaline is capsulated. For example, the alkaline may be capsulated with wax. Optionally, in the first step, the mixture may further comprise adding an oxidizing catalyst to avoid agglomeration. If present, other monomers may be added when the water-soluble olefinically unsaturated acid group containing monomers are added.

If the hydrogel is used for absorption of alkaline liquids or ammonia, or if the amount of basic igneous rock of Group A was sufficient to reach a non-sensitive pH-value to plants, then the hydrogel does not undergo further treatment. Generally, the hydrogel is neutralized in an amount about 0% to about 40%-mol when used for absorption of alkaline liquids or ammonia. If necessary, surplus acid may be neutralized by adding basic earth and/or alkalihydroxide or by mixing the cut or shredded product with chalk or dolomite.

The hydrogel of the invention may be shaped into blocks. If desired, the hydrogel may be shredded or comminuted. For example, the hydrogel may be sliced into mats of various forms. Square sticks are desirable for plants that require further amounts of minerals and nutrients during a later period of growth. The hydrogel may be shredded into a top-soil like, crumbly shaped hydrogel, similar-looking as humus. Immediately after polymerization, the hydrogel is somewhat sticky. The stickiness can be used to produce various forms and by squeezing together hydrogel pieces and/or crumbs.

After polymerization, the hydrogel is may be cut or shredded, creating numerous pockets for solids of varying particle-sizes and bulk-weights. The pockets allow for inserting different solids of a variety of size and bulk weight and prevent mineral separation during storage or transportation. The solids can be minerals as described above, or organic substances of natural or synthetic origin, here named as group "N" (non-mineral). The non-mineral group includes, but is not limited, to algae, bast, brown coal, hemp, wood, wholemeal of ricinus, hard coal, straw, peat, water-insoluble polymers, and water-swelling polymers. By inserting diverse materials into the pockets, the hydrogel may be useful for non-agricultural applications. The pockets are opened and closed by changing the water-content of the hydrogel.

The methods of the invention produce acidic to weakly neutral or weakly alkaline hydrogels having sponge-like structures, capable of absorbing water similar to superabsorbers independent of pH-value. The amount of water absorbed depends upon the pore- and gel-capacity. For example, when the hydrogel is mixed with soil, the mass fluctuates as a result of rain and draughts. The hydrogel mass fluctuation creates breathing of the soil, while the quality and the climate of the soil improve due to the mineral content of the hydrogel.

The hydrogel may be used for germination, growth, and cultivation of plants. Good results may be obtained when the hydrogel is mixed with soil, poor soil, and exposed to bad weather. The hydrogel of the invention may minimize the need for irrigation, and therefore, the hydrogel is especially helpful in rainless cultivation zones. Another application of the hydrogel of the invention is for plant cultivation. For example, the hydrogel of the invention may be used in plant buckets when growing from seeds, seedlings, or small plants. The hydrogel of the invention may be placed in plant buckets equipped with capillary poles connected to a water-reservoir. The hydrogel absorbs water and fertilizer from the water reservoir and transports the water and fertilizer to the plant's root system.

Additionally, the hydrogel when shredded with pores and pockets can be used as a carrier for numerous different solids. In particular, the pores and pockets may be filled with wholemeal of ricinus. Whole meal of ricinus is obtained by mining ricinus oil and is considered part of the group of solid fertilizers.

Another use of the hydrogel of the invention, is as a fertilizer-free product wherein the hydrogel is mixed with wood meal or sawdust and subsequently dried. The fertilizer-free product can be used as straw for animals like cats and dogs.

The hydrogel may be used where water-absorbing hydrogels with minerals and nutrients are required. After polymerization and when sticky, the hydrogel may be combined with fine, often dusty synthetic polymer particles, whose application in pure form is normally very problematic. The combination of hydrogel and synthetic polymer particles can be shaped into fabrics and fleeces or spread over fabrics and fleeces. The fabrics are particularly useful in slope cultivation where the slope prevents water from gathering or seeping into the soil. The materials may also be used in other areas, such as indoor potters and displays for goods for sale, potters, such as window potters or rooftop potters, coffins, and cascets. The hydrogel may be used in crumb-containing fabrics and fleeces additionally equipped with natural and synthetic material, that is light enough to float. The floating hydrogel can be used in moist areas for plant-growing such as rice or combined with insecticides, pesticides, bactericides, and/or fungicides for insect and pest control.

The hydrogel may also be used in cleaning implements, such as dusters, or for the transportation of dust, fine-grained minerals, and/or biologic-natural and/or synthetic solids.

These examples show that the inventive product with its extraordinary property and its pocket-structure is both a carrier for energy as well as storage for different solid and liquid substances.

Having described the invention with reference to certain preferred embodiments, other embodiments will become apparent to one skilled in the art from consideration of the specification. The invention is further defined by reference to the following examples describing in detail the preparation of the composition and methods of use of the invention. It will be apparent to those skilled in the art that many modifications, both to materials and methods, may be practiced without departing from the scope of the invention.

EXAMPLES

The ingredients used in the examples can be purchased from manufactures known to one skilled in the art. EIF- ELLAVA®: EIFELGOLD® was purchased from Urgesteinsmehl, FA. LAVA-UNION GmbH, D-53489 Sinzig; trass was purchased from Fa. Marker-Zementwerk GmbH, D-86665 Harburg; and bentonite was purchased from Smektonit Agrarbentonit 0/8, Fa. MARX Bergbau GmbH & Co. D-5431 Ruppach-Goldhausen. The chemicals were supplied by Fa Merck Eurolab GmbH, D-44866 Bochum. Fa. Wako Chemicals GmbH, Neuss: Wako V-50. Other suppliers for minerals and solids were Fa. Baerle & Co, D-76593 Gemsbach/Rhein: potassium-silicate (Kaliwasserglas, type 28-30° Bé); Fa. Henkel KGBA, D-40191 Dusseldorf: potassium-silicate, type 28-30° Bé.

Example 1

EIFELGOLD® (40 g), trass (15 g) and bentonite (15 g) were finely stirred into carbonated water (40 g) to form a solution which was poured in portions into a solution of acrylamide (15 g), acrylic acid (35 g), 1,4-dihydroxybutyl diacrylate (160 mg) and carbonated water (30 g), to control the foaming. Once foaming had ceased, the polymerization was initiated by sequentially adding an aqueous solution of Wako-V 50 (1 ml, 1% by weight), aqueous solution of sodium peroxide sulfate (2 ml, 1% by weight), aqueous solution of ascorbic acid (1 ml, 0.2% by weight), and aqueous solution of potassiumdisulfite (1 ml, 1.25% by weight). After polymerization, a porous hydrogel with the appearance of a sponge is produced. After waiting for a few minutes, the block can be sliced. The absorption of the hydrogel was minimal, because the acid groups of the polymers were not neutralized. When a slice of the hydrogel was placed in water (20° C.), containing potassium hydroxide (15 g) and potassium silicate (3 g, 50%), after 25 hours, a 30-fold weight increase was recorded.

Example 2

EIFELGOLD® (40 g), trass (15 g) and bentonite (15 g) were finely stirred into carbonated water (70 g) and portionwise poured into potassium silicate (5 g, 50% by weight) and a mixture of acrylic acid (50 g) and 1,4-dihydroxybutyl diacrylate (160 mg) to control foaming. After foaming ended, the polymerization was initiated as described in Example 1. When a slice of the hydrogel was placed in tap water (20° C.), containing potassium hydroxide (21.5 g), nearly a 40-fold weight increase was recorded after 24 hours.

Example 3

EIFELGOLD® (20 g) and bentonite (5 g) were stirred into carbonated water (70 g) and subsequently portionwise poured into potassium silicate (5 g, 50% by weight) and a mixture of acrylic acid (50 g) and 1,4-dihydroxybutyl diacrylate (160 mg), to control foaming. Once foaming has ceased, the polymerization was initiated as described in Example 1. When a slice of the hydrogel was placed in tap water (20° C.), containing potassium hydroxide (21.5 g), nearly a 60-fold weight increase was recorded after 24 hours.

Example 4

EIFELGOLD® (115 g), trass (15 g) and bentonite (20 g) were stirred into carbonated water (64 g) containing potassium silicate (12 g, 50% weight), potassium hydroxide (14 g), urea (2 g) and phosphoric acid (1.5 g, 50% by weight). To the mixture was added an aqueous solution of sodium peroxide disulfate (2 ml, 1% by weight). Thereafter, the solution was portionwise poured into a mixture of acrylic acid (50 g) and 1,4-dihydroxybutyl diacrylate (160 mg) to control foaming. Once foaming had ended, the polymerization was initiated as described in Example 1. When a slice of the hydrogel was placed in tap water (20° C.), nearly a 20-fold weight increase was recorded after 24 hours.

Example 5

EIFELGOLD® (100 g), trass (15 g), and a mixture bentonite/expanded clay (40 g, 1:1, additionally containing potassium hydroxide (10 g, 50% by weight) and potassium silicate (12 g), locked by capsulation with wax) were stirred into carbonated water (64 g), wherein the carbonated water had urea (2 g), phosphoric acid (1.5 g, 40% by weight), and potassium hydroxide (14 g). To the mixture was added an aqueous solution of sodium peroxide disulfate (2 ml, 1% by weight). Subsequently the solution was portionwise poured into a mixture of acrylic acid (50 g) and 1,4-dihydroxybutyl diacrylate (200 mg) to control foaming. Once foaming ceased, the polymerization was initiated as described in Example 1. When a slice of the hydrogel was placed in tap water (20° C.), nearly a 28-fold weight increase was recorded after 24 hours.

Example 6

Shredded hydrogel made according to Example 4 (100 g) was mixed with calcium carbonate (15 g), partially dried, and then used as plant-substratum for barley. The growth results were good as compared to the growth without the hydrogel.

Example 7

Shredded hydrogel made according to Example 4 (100 g) was mixed with sawdust (100 g) and partially dried and then used as cat-litter.

Example 8

Shredded hydrogel made according to Example 4 (100 g) was mixed with whole meal of ricinus (100 g), partially dried and used in window-boxes.

The invention claimed is:
1. A hydrogel comprising:
   a polymer of polymerized unsaturated carboxylic acid monomers;
   at least one igneous rock; and
   solid additives,
   wherein the unsaturated carboxylic acid monomers are polymerized and bound in a crosslinked polymer having a porous structure and capable of forming a hydrogel with water and liquids.
2. The hydrogel according to claim 1, wherein the amount of mineral nutrient and solid additives is at least 30% by weight of the polymer composition.
3. The hydrogel according to claim 1, wherein the solid additives are at least one of acid-sensitive minerals, absorbing minerals, ballast and fillers, or natural or synthetic materials of Group N, wherein the natural or synthetic materials of Group N include algae, bast, brown coal, hemp, wood, wholemeal of ricinus, hard coal, straw, peat, or water-soluble polymers.

4. The hydrogel according to claim 1, wherein the igneous rock is at least one of basic igneous rock or acidic igneous rock.

5. The hydrogel according to claim 3, wherein the acid-sensitive materials produce carbon dioxide for displacing oxygen from the reaction mixture.

6. The hydrogel according to claim 5, wherein the acid sensitive materials are at least one of chalk, dolomites, trass, and magnesite.

7. The hydrogel according to claim 3, wherein the absorbing minerals are at least one of thickeners, sponge-stabilizers, cation-catchers, polymerization-inhibitors, and swelling-promoters.

8. The hydrogel according to claim 3, wherein the ballast and fillers are at least one of feldspar and quartz-sand.

9. The hydrogel according to claim 1, wherein the polymer further comprises at least one water soluble monomer; at least one crosslinking agent; and at least one water soluble polymer.

10. The hydrogel according to claim 9, wherein the unsaturated acid group containing monomer is present in an amount of about 55% to 99% by weight;
the water soluble monomer is present in an amount of about 0% to 40% by weight;
the crosslinking agent is present in an amount of about 0.01% to 5% by weight; and
the water-soluble polymer is present in an amount of about 0% to 30% by weight.

11. The hydrogel according to claim 9, further comprising a water-soluble alkali silicate selected from the group consisting of sodium- or potassium-silicate.

12. The hydrogel according to claim 9, further comprising at least one solid or liquid having potassium, nitrogen, phosphorus, or silicon containing fertilizers.

13. The hydrogel according to claim 9, wherein the unsaturated acid group containing monomer is at least one of acrylic acid, methacrylic acid, maleic acid, fumaric acid, itaconic acid, vinyl-sulfonic-acid, acrylamido-2-methylpropane-sulfonic-acid, 2-methylacryloyl-oxiethane-sulfonic-acid, 4-vinyl-benzene-sulfonic-acid, allyl-sulfonic-acid, vinyl-toluene-sulfonic-acid, vinyl-phosphonic-acid, or vinyl-benzene-phosphonic-acid.

14. The hydrogel according to claim 13, wherein the unsaturated acid group containing monomer is at least one of acrylic acid, meth-acrylic acid, or maleic acid.

15. The hydrogel according to claim 9, wherein the water soluble monomer is at least one of acrylamide, methacrylamide, N-alkylene methacrylamide, N-dialkyleneamino-alkylene methacrylamide, N-dialkyleneamino-alkylene methacrylamide, N-methylol-methacrylamide, N-vinylformamide, N-vinyl-acetamide, N-vinyl-N-methyl-acetamide, N-vinyl-N-methyl-formamide, hydroxy-ethyl-acrylate, methacrylic acid-ester of polyethylene-glycol-mono-allyl-ether, or allyl ether of polyethylene-glycol.

16. The hydrogel according to claim 1, wherein the polymerized unsaturated acid group containing monomers are predominantly potassium-salts.

17. The hydrogel according to claim 1, wherein the mineral nutrient is lava rock with a particle size less of than 200 µm.

18. The hydrogel according to claim 17, wherein the particle size is less than 100 µm.

19. A process making a hydrogel comprising;
mixing mineral nutrients, solid additives, and alkaline material in water to form a slurry;
adding at least one unsaturated acid group containing monomer and optionally adding at least one crosslinking agent to the slurry;
releasing carbon dioxide and foaming the slurry;
polymerizing the monomers to form a hydrogel; and
hardening the hydrogel.

20. The process according to claim 19, further comprising adding water soluble monomers, and/or water soluble polymers when adding the unsaturated acid group containing monomer.

21. The process according to claim 19, further comprising cutting and/or shredding the hardened hydrogel.

22. The process according to claim 19, further comprising adding at least one oxidizing catalyst to avoid clumping together of the solid minerals during mixing.

23. The process according to claim 19, wherein the alkaline material comprises alkali hydroxide, alkali carbonate, alkali silicate and is present in an amount not more than 40%-mol of the acids in the unsaturated acid containing monomer.

24. The process according to claim 23, wherein the polymer composition has a degree of neutralization of 0-40% mol.

25. A method for absorbing aqueous basic liquids, ammonia, or bacterial decomposition of organic materials using the hydrogel according to claim 1.

26. A method of supplying nutrients and water to plants comprising administering to a plant the hydrogel according to claim 1.

27. The method according to claim 26, wherein the hydrogel further comprises a solid or liquid fertilizer.

28. The method according to claim 26, wherein the hydrogel is embedded in natural and/or synthetic flat fiber structures.

29. The method according to claim 28, wherein the fiber structures is a mat or fleece.

30. The method according to claim 26, wherein the hydrogel is embedded in natural and/or synthetic flat fiber structures with lightweight natural or synthetic materials for cultivation of plants in moist areas in completely or partly flooded regions.

31. The method according to claim 26, wherein the hydrogel further comprises at least one insecticide, pesticide, bactericide, or fungicide.

* * * * *